United States Patent Office 3,450,742
Patented June 17, 1969

3,450,742
PREPARATION OF TRINITRATOPENTA-
ERYTHRITYL ACRYLATE
William D. Emmons, Huntingdon Valley, and Henry A. Rolewicz, Levittown, Pa., assignors to Rohm & Haas Company, Philadelphia, Pa., a corporation of Delaware
No Drawing. Continuation-in-part of application Ser. No. 644,956, Mar. 8, 1957. This application Nov. 3, 1958, Ser. No. 771,679
Int. Cl. C07c 77/02; C06b 3/00
U.S. Cl. 260—467          4 Claims This application is a continuation-in-part of application Ser. No. 644,956 filed Mar. 8, 1957, now abandoned.

This invention deals with a method for preparing trinitratopentaerythrityl acrylate of high assay and of a purity such that this ester is eminently suitable for its various uses, such as the preparation of polymers, including homopolymers and copolymers, which will have to a high degree the properties of uniformity and reproducibility. Furthermore, both the monomer and polymers therefrom are stable during handling and storage.

It has previously been proposed to esterify pentaerythritol trinitrate with acrylic acid or acryloyl chloride by methods which led only to non-uniform products containing various by-products and impurities. These previous preparations do not give a good assay of the desired trinitratopentaerythrityl acrylate. Sometimes by methods of the prior art there occurs decompositions during the preparation. The final products of the art have been variable in quality and poorly reproducible.

The polymers formed from the preparation of the prior art have been of low molecular weight. The polymers have tended to cross-link very readily and thus become prematurely infusible and insoluble. In short these prior art materials have fallen short of their theoretical capabilities.

The serious short-comings of the prior art ester, it has now been discovered, can be avoided by a method of preparing the desired ester by reacting pentaerythritol trinitrate and acryloyl chloride in the presence of dimethylaniline and in a selected inert polar organic solvent at temperatures below about 30° C. While somewhat higher temperatures might be used, yield and product quality tend to decrease rather markedly.

Since the reaction is exothermic, steps must be taken to ensure that temeprature is controlled. This can be done by supplying adequate cooling, mixing reactants gradually, and/or starting the reaction at a low enough temperature to prevent the reaction mixture from reaching temperatures giving a poor quality product. The presence of a solvent is of considerable help in the control of temperature through providing a favorable medium for mixing of reactants and improving transfer of heat of reaction.

The nature of the solvent has a considerable influence on the outcome of the reaction. Some of the best results with respect to quality of product and yield have been obtained with acetonitrile. Satisfactory results have also been obtained with methylene chloride, acetone, dioxane, or methyl ethyl ketone, or mixtures of two or more of these solvents.

Sufficient solvent is used to maintain the reaction mixture in a fluid state. The proportion of solvent will, of course, depend upon the particular inert organic solvent or solvents used. In general it is desirable to use about as large a volume of solvent as of reactants. While an upper limit of about four volumes of solvent per volume of reactants can be used, yields seem to become somewhat less favorable and volume ratios of 1:1 to 2:1 are preferred.

The solvent is used to take up the pentaerythritol trinitrate or both pentaerythritol trinitrate and dimethylaniline or pentaerythritol trinitrate and acryloyl chloride. The other reactants or reactant is added to the mixture formed with solvent. Thus, to the solvent-pentaerythritol trinitrate mixture is added acryloyl chloride and then the dimethylaniline or both of these are added together. Again, to the solvent-pentaerythritol trinitrate-acryloyl chloride mixture there is added dimethylaniline or to the solvent-pentaerythritol trinitrate-dimethylaniline mixture there is added acryloyl chloride.

The three components of the reaction may be used in about chemically equivalent amounts. Usually, however, there is used a slight excess of acryloyl chloride and of dimethylaniline over the pentaerythritol trinitrate. Up to a 30% excess of either or both of these reactants is convenient to assist in consuming all of the pentaerythritol trinitrate, increasing yields based on this alcohol, and decreasing contaminants.

The hydrogen chloride split out is taken up by the tertiary amine. Although other amines can perform this same function and have been tried for this purpose, no other amine than dimethylaniline appears to be quite so effective or efficient.

While it is possible to vary the tertiary phenyl amine by using an N-ethyl group or having a small ring-substituent, such as methyl for example, there is little if anything to be gained thereby and it seems better to use the simplest phenyl amine. When it is converted to the hydrochloride, this salt form can be readily washed away with water.

The simplest way to control temperature is to start the reaction at a low temperature, such as between −10° C. and +10° C., and mix the reactants slowly. Of course, if good cooling is supplied, the initial temperature need not be quite so low, as will be obvious to those skilled in the art. Any procedure or technique which keeps the final temperature of the reaction mixture at about 20° to 30° C. is suitable.

The actual reaction is fairly fast and the time needed is rather one of convenience for thorough mixing and control of reaction temperature. Times of 10 minutes to several hours can be used, depending upon just how mixing is accomplished, upon the efficiency of heat transfer, and similar considerations.

The reaction mixture is worked up to recover the desired ester. The best method will depend in part upon the particular solvent or solvents used. If the solvent is water-miscible, the reaction mixture is conveniently quenched with water. Thus, a reaction mixture in acetonitrile can be poured into an excess of water or the reaction mixture is diluted with water to precipitate the ester formed. The product may be washed with aqueous dilute acid solution or an aqueous dilute mildly alkaline solution, such as aqueous sodium carbonate solution, or with both such solutions, and then with water. In this way traces of acid halide or of amine or both are removed. If desired, the precipitated product may be dissolved in a water-immiscible solvent, such as methylene chloride, and this solution extracted with a dilute aqueous solution of an acid, such as sulfuric, hydrochloric, or phosphoric, and with water. The product may be recovered from the extracted solution by evaporating the solvent or by chilling or by precipitating by addition of an organic liquid which is a non-solvent for the trinitratopentaerythrityl acrylate.

If a water-immiscible solvent was used in the reaction stage, the reaction mixture may likewise be mixed with water and water-soluble products removed. The ester remains in the organic layer and is recoverable by evaporating the solvent, by chilling the solution, or by adding a non-solvent for the ester.

The product thus obtained is already superior to the crude esters of the prior art, yet an even purer product can be prepared by crystallization. For instance, the washed solid may be dissolved in hot methanol and crystallized.

Further details of this invention are given in the following examples which are presented for purposes of illustration and not by way of limitation. Parts are by weight unless otherwise designated.

EXAMPLE 1

To a twelve-liter, three-neck flask equipped with a stirrer, a thermometer, and an addition funnel was added 2710 g. of pentaerythritol trinitrate (10.0 g. moles), 670 g. of acetonitrile, and 1575 g. of N,N-dimethylaniline (13.0 g. moles). The resulting solution was cooled to 0-5° C. and the dropwise addition of 1177 g. of acryloyl chloride (13.0 g. moles) was begun. The latter was added at a uniform rate over a fifteen minute period. The temperature of the reaction mixture rose rapidly during this time and was maintained at 25-30° C. by means of an externally applied cooling bath. The reaction mixture was stirred at 30° C. for an additional half-hour period and then poured in a thin stream into 22.5 kg. of vigorously stirred water. The trinitratopentaerythrityl acrylate precipitated immediately as a white solid and was isolated in a basket centrifuge. The product was rinsed with water then dissolved in 11 kg. of warm methylene chloride. The solution was washed twice with 2500 g. portions of 10% (wt.) sulfuric acid and twice with like quantities of water. The organic solution was dried over 100 g. of anhydrous magnesium sulfate and chilled for one-half hour in a Dry Ice-acetone bath. The white crystalline trinitratopentaerythrityl acrylate which precipitated from solution was isolated on a filter and rinsed with 1300 g. of ethyl ether. After thorough drying at 30° C., a yield of 2510 g. of trinitratopentaerythrityl acrylate was realized. The monomer thus obtained melted sharply at 78° C. Assays based on such tests as bromination of the acrylic ester double bond, saponification of the acrylate group, and infrared spectrophotometric techniques indicated that the product thus prepared consisted of trinitratopentaerythrityl acrylate of a purity of over 97% by weight. When a sample of the above product was heated for a one-hour period at 85° C., a clear, hard, colorless polymeric product was obtained.

EXAMPLE 2

A solution of 2710 g. of pentaerythritol trinitrate in 670 g. of acetonitrile was chilled to −10° C. in a stirred glass reactor and 1177 g. of acryloyl chloride was added in a stream. An external cooling bath was applied to the reaction vessel and the dropwise addition of 1575 g. of N,N-dimethylaniline was begun immediately. The temperature of the reaction mixture rose rapidly and was maintained at about 20° C. by adjustment of the N,N-dimethylaniline addition rate. The addition required about fifteen minutes. The mixture was stirred at 20-25° C. for a half-hour and then poured in a thin stream into 22.5 kg. of vigorously stirred water. The trinitratopentaerythrityl acrylate precipitated immediately as a light yellow solid which rapidly settled to the bottom of the quenching vessel when stirring was interrupted. The supernatant solution containing dissolved salts and other reaction by-products was separated from the trinitratopentaerythrityl acrylate and the latter was washed by mixing with three 10 kg. portions of water and decanting. The trinitratopentaerythrityl acrylate was dissolved in 11 kg. of methylene chloride and the solution thus obtained was washed once with 2500 g. of 10% (wt.) sulfuric acid and twice with like quantities of water. After desiccation with 100 g. of anhydrous magnesium sulfate, the methylene chloride solution was chilled to about −40° C. for a half-hour period, whereupon the solid trinitratopentaerythrityl acrylate which precipitated from solution was isolated on a filter. It was washed with 1300 g. of ethyl ether to yield, after thorough drying, 2400 g. of trinitratopentaerythrityl acrylate. The product was recrystallized from 7.9 kg. of hot methanol to yield 2100 g. of trinitratopentaerythrityl acrylate which assayed above 99% by the methods discussed in Example 1. When heated at 85° C. for one hour, or at 80° C. in the presence of such polymerization catalysts as benzoyl peroxide for a similar length of time, a clear, hard polymeric product was obtained.

The trinitratopentaerythrityl acrylate prepared as above is advantageous as compared to the ester made by previous methods in stability, purity, and utility. For example, preparations of ester based on a method involving thionyl chloride were variable in stability. Some of these previous preparations self-ignited when stored at room temperatures while others were thermally unstable. These difficulties are avoided in the ester as prepared by the method of this invention.

Under the conditions used in this method the disproportionation of pentaerythritol trinitrate, such as readily occurs in an acid environment, does not take place. Hence, there is avoided the formation of dinitratopentaerythrityl diacrylate, which is a material causing cross-linking and insolubility of polymer. Cross-linking seriously interferes with the practical utility of trinitratopentaerythrityl acrylate. Since polymer from the ester prepared according to the method of this invention remains thermoplastic and can be dissolved, plasticized, and shaped, it is useful not only for purposes in which the previously known ester and its polymer found application but also for new uses. It may be used for plastic bonding of explosives. It may enter into a variety of explosive and combustible compositions.

For instance, with observance of proper precautions for handling and formulating potentially explosive compositions there are mixed 35 parts of trinitratopentaerythrityl acrylate, 65 parts of pentaerythritol trinitrate, and 0.007 part of a polymerization inhibitor, such as p-methoxyphenol or N-nitrosodiphenylamine. The heated mixture is evacuated to remove entrapped air and cast into war head castings. The loaded casings are cured at 80° C. for 48 hours. Such casings may be used in rockets.

The ester may be used to form castings of polymer in desired shapes. For example, there are mixed 100 parts of monomeric ester and 0.02 part of inhibitor. The mixture is heated to 80° C. under reduced pressure. The resulting liquid is run into molds which are in the shape of shell casings and which are coated with polytetrafluoroethylene. The filled molds are heated at about 80° C. for 48 hours to form polymer in the shape of the casings. These are loaded with a conventional nitrocellulose gun propellant and equipped with an igniter, squib, and projectile. There is thus provided a combustible casing which adds to muzzle velocity and avoids need of a cartridge ejection device.

The monomeric ester and/or polymers or copolymers therefrom may be mixed with conventional oxidizers, such as nitrates, to provide combustible and explosive mixtures. Thus, there may be mixed 5 to 50 parts of the monomer and/or polymer with 95 to 50 parts of ammonium or potassium nitrate to provide such mixtures. Other nitrate compounds may also be used in such mixtures and conventional agents which are used in such mixtures may also be incorporated.

We claim:

1. A process for preparing trinitratopentaerythrityl acrylate which comprises reacting acryloyl chloride, pentaerythritol trinitrate, and dimethylaniline in an inert polar organic solvent from the class consisting of acetonitrile, methylene chloride, acetone, methyl ethyl ketone, dioxane and mixtures thereof at temperatures not over about 30° C., the proportion of dimethylaniline being from about equivalent to the pentaerythritol trinitrate up to a 30% excess.

2. A process for preparing trinitratopentaerythrityl acrylate which comprises reacting acryloyl chloride, pentaerythritol trinitrate, and dimethylaniline in an acetonitrile at temperatures not over about 30° C., mixing the resulting reaction mixture with water, and separating trinitratopentaerythrityl acrylate, the proportion of dimethylaniline being from about equivalent to the pentaerythritol trinitrate up to a 30% excess.

3. A process for preparing trinitratopentaerythrityl acrylate which comprises reacting acryloyl chloride, pentaerythritol trinitrate, and dimethylaniline in acetonitrile at a temperature not over about 30° C., the acryloyl chloride being about equivalent to the pentaerythritol trinitrate and the proportion of dimethylaniline being from about equivalent to the pentaerythritol trinitrate up to a 30% excess.

4. A process for preparing trinitratopentaerythrityl acrylate which comprises reacting acryloyl chloride, pentaerythritol trinitrate, and dimethylaniline in acetonitrile starting at a temperature between −10° C. and +10° C. and continuing at temperatures not over about 30° C., the acryloyl chloride and the dimethylaniline being from about equivalent to the pentaerythritol trinitrate up to a 30% excess of the pentaerythritol trinitrate, mixing the resulting reaction mixture with water, and separating trinitratopentaerythrityl acrylate.

References Cited

UNITED STATES PATENTS 3,238,245  3/1966  Reedy _____ 260—467

LELAND A. SEBASTIAN, *Primary Examiner.*

U.S. Cl. X.R.

149—11, 19, 60, 62, 93